(12) United States Patent
Nishio (10) Patent No.: US 9,128,656 B2
(45) Date of Patent: Sep. 8, 2015

(54) INFORMATION PROCESSING SYSTEM, INFORMATION PROCESSING APPARATUS, AND INFORMATION PROCESSING METHOD FOR AVOIDING OVERLAP OF LOGS

(75) Inventor: Satoru Nishio, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 133 days.

(21) Appl. No.: 13/607,888

(22) Filed: Sep. 10, 2012

(65) Prior Publication Data

US 2013/0063777 A1    Mar. 14, 2013

(30) Foreign Application Priority Data

Sep. 13, 2011 (JP) .................................. 2011-199584

(51) Int. Cl.
   *G06F 15/02* (2006.01)
   *G06F 3/12* (2006.01)
   *G03G 15/00* (2006.01)
   *H04N 1/32* (2006.01)

(52) U.S. Cl.
   CPC .......... *G06F 3/1288* (2013.01); *G03G 15/5083* (2013.01); *G06F 3/1207* (2013.01); *G06F 3/1273* (2013.01); *H04N 1/32122* (2013.01); *H04N 2201/0082* (2013.01); *H04N 2201/0094* (2013.01); *H04N 2201/3221* (2013.01); *H04N 2201/3274* (2013.01)

(58) Field of Classification Search
   None
   See application file for complete search history.

(56) References Cited

U.S. PATENT DOCUMENTS

| 2005/0243366 | A1* | 11/2005 | Fukuda ........................ 358/1.15 |
| 2007/0146778 | A1 | 6/2007 | Kitagata et al. |
| 2008/0228937 | A1* | 9/2008 | Araumi ........................ 709/232 |
| 2009/0260069 | A1* | 10/2009 | Nakajima ........................ 726/7 |
| 2011/0067026 | A1 | 3/2011 | Nishio |

FOREIGN PATENT DOCUMENTS

| JP | 2003-289412 | 10/2003 |
| JP | 2007-200284 | 8/2007 |

(Continued)

OTHER PUBLICATIONS

Extended European search report dated Nov. 7, 2013.

(Continued)

*Primary Examiner* — King Poon
*Assistant Examiner* — Andrew H Lam
(74) *Attorney, Agent, or Firm* — IPUSA, PLLC (57) ABSTRACT

An information processing system that includes: a job execution apparatus; an information processing apparatus configured to send a job to the job execution apparatus; and an information management apparatus configured to store log information of the job, the information processing apparatus including: a job sending unit configured to send identification information of each job to the job execution apparatus with the job; and a first log sending unit configured to send the log information of the job to the information management apparatus by including the identification information into the log information, and the job execution apparatus including: a second log sending unit configured to include the identification information into the log information of the job, and to send the log information to the information management apparatus, wherein the information management apparatus integrates pieces of log information having common identification information, and stores the integrated log information.

6 Claims, 10 Drawing Sheets (56) References Cited

FOREIGN PATENT DOCUMENTS

| JP | 2008-052679 | 3/2008 |
| JP | 2009-123075 | 6/2009 |
| JP | 2009-252125 | 10/2009 |
| JP | 2011-059631 | 3/2011 |

OTHER PUBLICATIONS

Japanese Office Action dated Apr. 14, 2015.

* cited by examiner

| AUTHENTICATION USER NAME | USER A |
|---|---|
| AUTHENTICATION PASSWORD | * * * * |
| AUTHORITY INFORMATION | COPY, PRINT |
| BELONGING GROUP NAME | GROUP A |
| UPPER LIMIT VALUE | 25 |
| CONSUMED AMOUNT | 15 |
| : | : |

FIG.7

| ITEM | VALUE |
|---|---|
| USER NAME | noLog |
| MACHINE ID | MACHINE A |
| DATE AND TIME | ... |
| JOB ATTRIBUTE INFORMATION | ... |
| : | : |

| ITEM | VALUE |
|---|---|
| USER NAME | FLAG:<TRACK ID> |
| MACHINE ID | MACHINE A |
| DATE AND TIME | ... |
| JOB ATTRIBUTE INFORMATION | ... |
| TRACK ID | ... |
| : | : |

# INFORMATION PROCESSING SYSTEM, INFORMATION PROCESSING APPARATUS, AND INFORMATION PROCESSING METHOD FOR AVOIDING OVERLAP OF LOGS

CROSS-REFERENCE TO RELATED APPLICATIONS

The present application is based upon and claims the benefit of priority of Japanese patent application No. 2011-199584, filed on Sep. 13, 2011, the entire contents of which are incorporated by reference in their entirety.

BACKGROUND OF THE INVENTION

1. Field of the Invention

The present invention relates to an information processing system, an information processing apparatus, and an information processing method.

2. Description of the Related Art

For example, Japanese Laid-Open Patent Application No. 2007-200284 discloses a print server. The print server is placed between a client PC and an image forming apparatus, stores a print job transmitted from the client PC, and transfers the stored print job to the image forming apparatus according to a request from the image forming apparatus. In a print system including such a print server, a user enters a print instruction into the client PC first. The client PC sends a print job according to the print instruction to the print server. The print server stores the print job in a storage device such as a HDD (hard Disk Drive) instead of immediately transferring the print job to the image forming apparatus. After that, the user operates the image forming apparatus in order to instruct the image forming apparatus to print the print job. The image forming apparatus obtains the print job from the print server according to the instruction so as to perform printing.

According to such a print system, the user can select an image forming apparatus for printing after entering the print instruction.

On the other hand, logs of processing of the image forming apparatus are recorded for the purpose of obtaining usage status and analyzing failures and the like. In a medium-sized or large-sized user environment where a plurality of image forming apparatuses are placed, a server (to be referred to as "log server" hereinafter) is placed for collectively managing logs. An image forming apparatus such as a line printer (to be referred to as a low-end machine hereinafter) that does not have a high-capacity auxiliary storage device can not record a log. Therefore, in a period when the low-end machines were the mainstream, recording of logs and transferring of logs to the log server were performed by the print server.

However, in recent years, there is an image forming apparatus (to be referred to as high-end machine hereinafter), such as a multifunctional machine, having a high-capacity auxiliary storage device such as the HDD (Hard Disk Drive). The high-end machine can record logs, and transfer the logs to the log server. In a case when a print server having a function of transferring logs to the log server is used together with the high-end machine, there may be a case where a log of a print job is sent from the print server to the log server, and also a log of the print job is sent from the high-end machine to the log server. Thus, there is a possibility that logs of a print job overlap at the log server. If it is not specified that the logs relate to the same print job, there is a possibility that usage status and the like cannot be ascertained correctly.

SUMMARY OF THE INVENTION

Accordingly, it is an object of an embodiment of the present invention to provide an information processing system, an information processing apparatus, and an information processing method that can avoid overlapping of a plurality of logs of one print job.

According to an embodiment, there is provided an information processing system that includes:
a job execution apparatus;
an information processing apparatus configured to send a job to the job execution apparatus; and
an information management apparatus configured to store log information of the job,
the information processing apparatus including:
a job sending unit configured to send identification information of each job to the job execution apparatus with the job; and
a first log sending unit configured to send the log information of the job to the information management apparatus by including the identification information into the log information, and
the job execution apparatus including:
a second log sending unit configured to include the identification information into the log information of the job, and to send the log information to the information management apparatus,
wherein the information management apparatus integrates pieces of log information having common identification information, and stores the integrated log information.

According to the embodiment, overlapping of a plurality of pieces of log information of one print job can be avoided.

Other objects and further features of the present invention will be apparent from the following detailed description when read in conjunction with the accompanying drawings.

DESCRIPTION OF THE PREFERRED EMBODIMENTS

Figure 1:
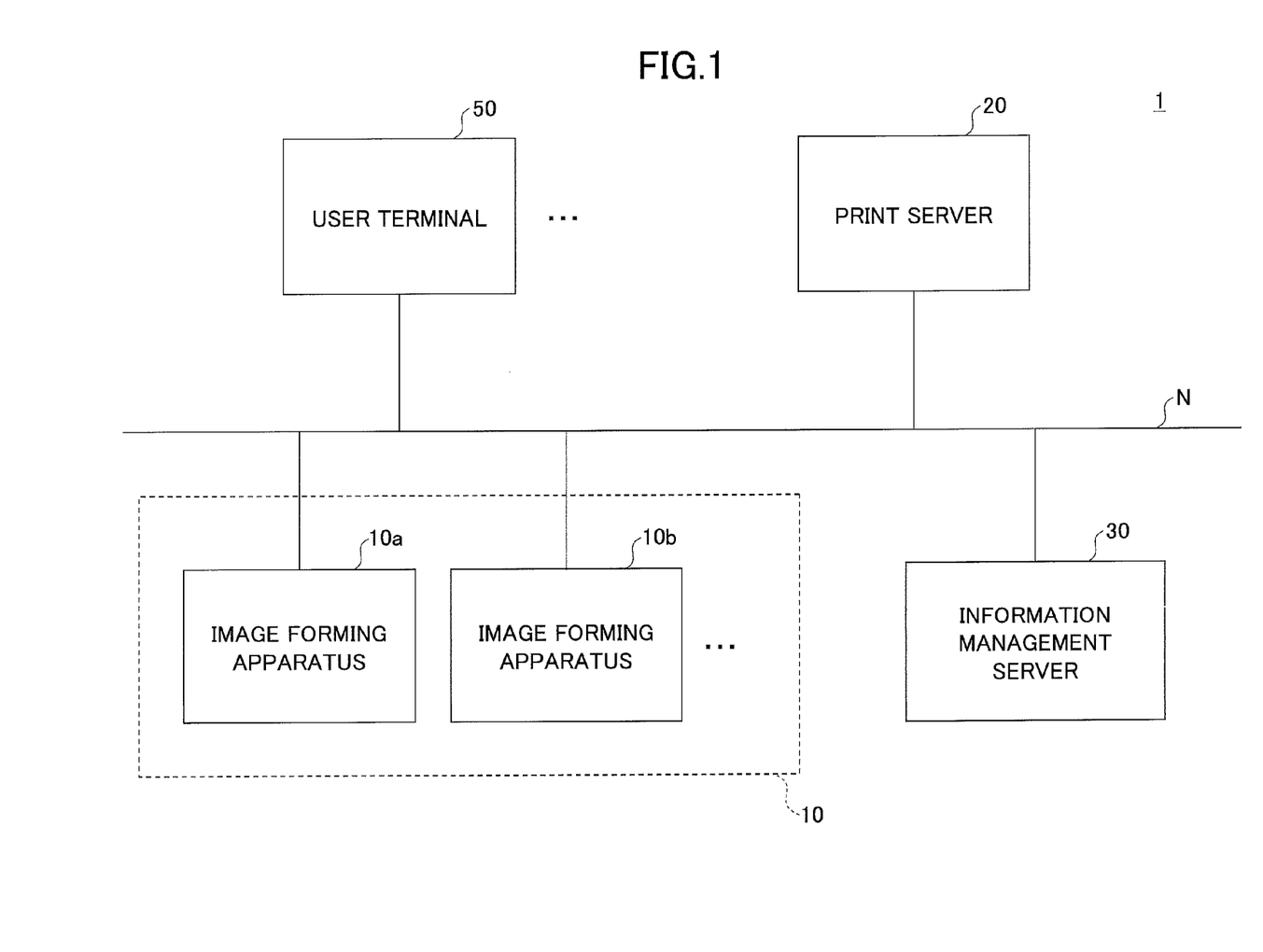
FIG. 1 is a diagram showing a configuration example of an information processing system in an embodiment of the present invention.

In the following, an embodiment of the present invention is described with reference to figures. FIG. 1 is a diagram showing a configuration example of an information processing system in an embodiment of the present invention. In the information processing system 1 shown in the figure, one or more image forming apparatuses such as image forming apparatuses 10a and 10b (to be referred to as "image forming apparatus 10" when each image forming apparatus is not distinguished), a user terminal 50, a print server 20 and an information management server 30 are connected via a network N (which may be a cable network or a radio network) such as the Internet such that they can communicate with each other.

The image forming apparatus 10 may be an apparatus (multifunctional machine) that realizes two or more of functions of printing, scanning, copying, FAX sending/receiving and the like with one body, or may be an apparatus having a single print function such as a line printer. In the present embodiment, the image forming apparatus 10a is a multifunctional machine and the image forming apparatus 10b is a line printer.

The user terminal 50 is a computer that generates a print job (print data) according to an instruction input by a user, and transmits the generated print job to the print server 20.

The print server 20 is a computer that stores (or spools) the print job transferred from the user terminal 50 so as to realize a stored document print function. The stored document print function is a function for storing a print job, instead of immediately executing the print job, according to a print instruction by a user, and executing the stored print job according to user's operation at the image forming apparatus 10. Therefore, the print server 20 transfers the stored print job to the image forming apparatus 10 according to a request from the image forming apparatus 10.

The information management server 30 is a computer that manages logs on print jobs executed by the image forming apparatus 10, and that manages user information of the information processing system 1. Since the image forming apparatus 10 executes a job, the image forming apparatus 10 may be referred to as a job execution apparatus.

Figure 2:
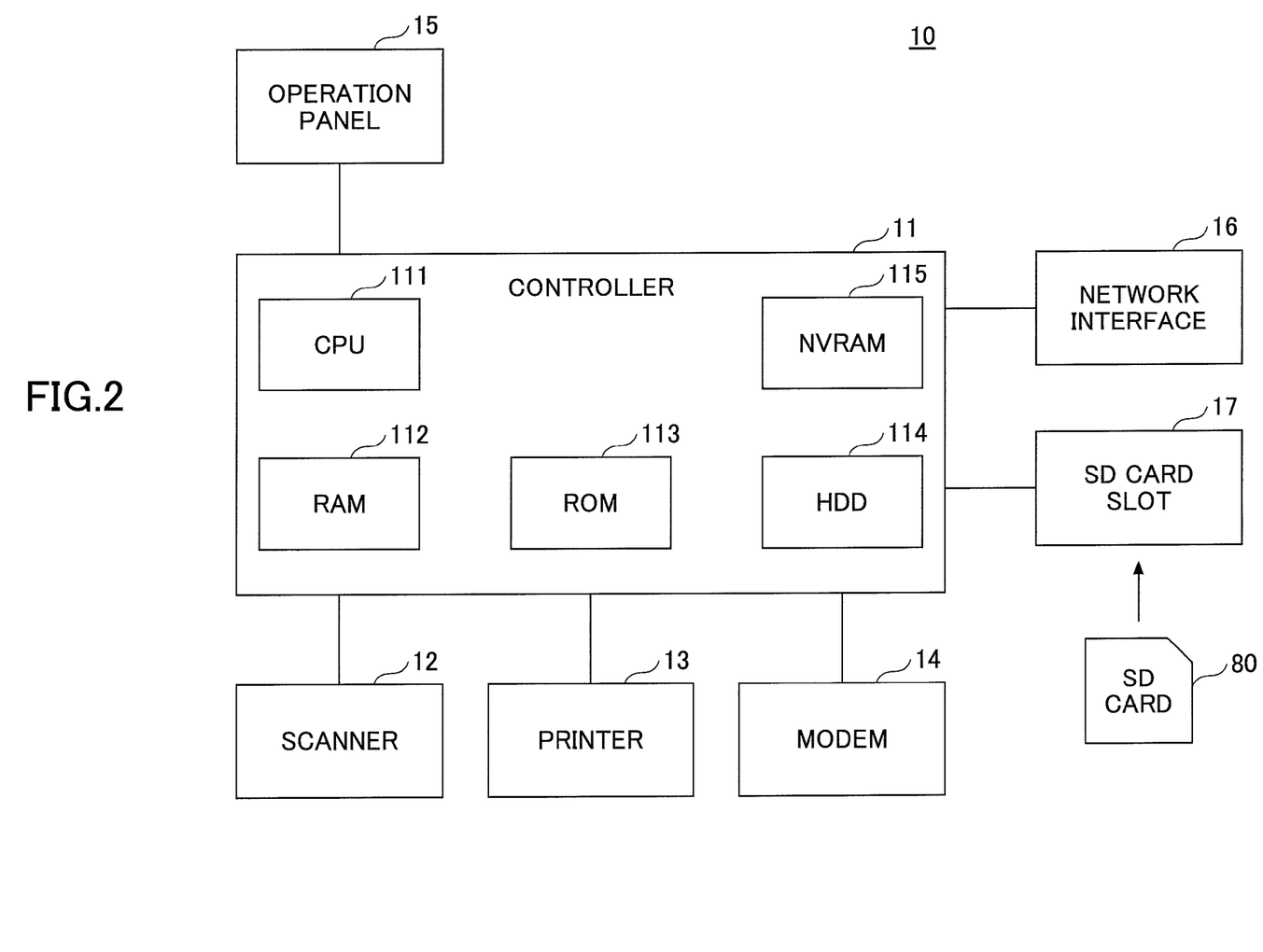
FIG. 2 is a diagram showing a hardware configuration example of an image forming apparatus in an embodiment of the present invention.

FIG. 2 is a diagram showing a hardware configuration example of an image forming apparatus 10 in an embodiment of the present invention. As shown in the figure, the image forming apparatus 10 includes, as hardware components, a controller 11, a scanner 12, a printer 13, a modem 14, an operation panel 15, a network interface 16, and an SD card slot 17 and the like.

The controller 11 includes a CPU 111, a RAM 112, a ROM 113, a HDD 114, and a NVRAM 115 and the like. The ROM 113 stores various programs and data used by the programs and the like. The RAM 112 is used as a storage area for loading a program, and as a work area for a loaded program, and the like. The CPU 111 realizes various functions by processing the program loaded in the RAM 112. The HDD 114 stores programs and various data and the like used by the programs. The NVRAM 115 stores various setting information and the like.

The scanner 12 is hardware (image reading unit) for reading image data from a document. The printer 13 is hardware (printing unit) configured to print data on a printing paper. The modem 14 is hardware configured to connect to a telephone line, that is used for sending and receiving image data by FAX communication. The operation panel 15 is hardware including an input unit such as a button for receiving an input from a user, and including a display unit such as a liquid crystal panel and the like. The liquid crystal panel may include a function of a touch panel. In this case, the liquid crystal panel also serves as a function of the input unit. The network interface 16 is hardware configured to connect to a network (which may be a cable network or a wireless network) such as a LAN. The SD card slot 17 is used for reading a program stored in the SD card 80. That is, in the image forming apparatus 10, not only a program stored in the ROM 113, but also a program stored in the SD card 80 may be loaded in the RAM 112 and executed. The SD card 80 may be replaced with another recording medium (such as a CD-ROM or a USB (Universal Serial Bus) memory, for example). That is, the type of the recording medium corresponding to the SD card 80 is not limited to a specific one. In this case, it is only necessary that the SD card slot 17 is replaced with hardware corresponding to the type of the recording medium.

The image forming apparatus 10b does not include the scanner 12, the modem 14, and the HDD 114.

Figure 3:
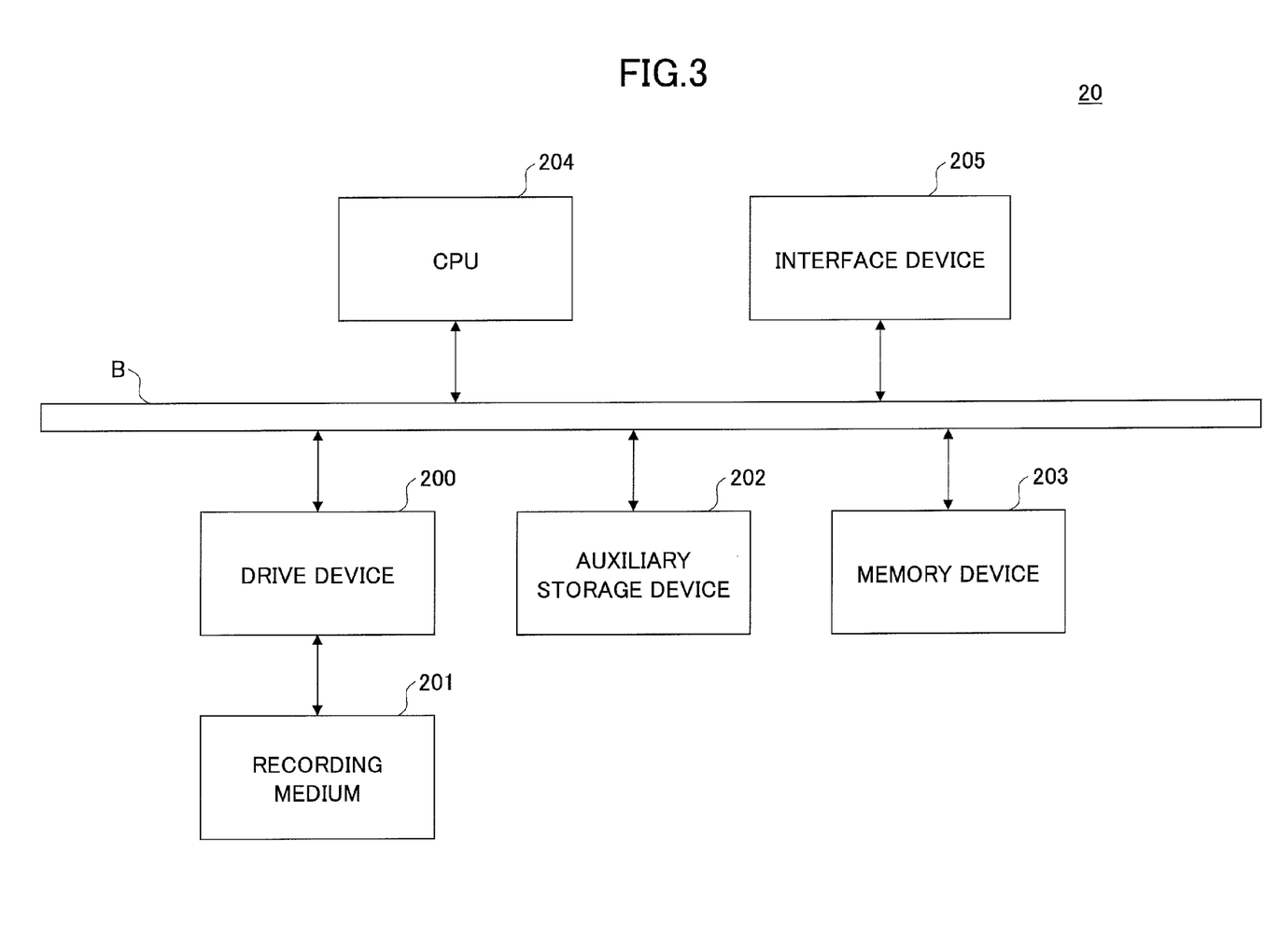
FIG. 3 is a diagram showing a hardware configuration example of a print server according to an embodiment of the present invention.

FIG. 3 is a diagram showing a hardware configuration example of a print server 20 according to an embodiment of the present invention. The print server 20 of FIG. 3 includes a drive device 200, an auxiliary storage device 202, a memory device 203, a CPU 204 and an interface device 205 that are connected with each other by a bus B.

A program for realizing processing of the print server 20 is provided by a recording medium 201 such as a CD-ROM and the like. When the recording medium 201 in which the program is recorded is set in the drive device 200, the program is installed in the auxiliary storage device 202 via the drive device 200 from the recording medium 201. However, it is not necessary to install the program from the recording medium 201. The program may be downloaded from another computer via a network. The auxiliary storage device 202 stores the installed program, and also stores necessary files and data and the like.

When receiving a program launch instruction, the memory device 203 reads the program from the auxiliary storage device 202 and stores the program. The CPU 204 executes a function of the print server 20 according to the program stored in the memory device 203. The interface device 205 is used as an interface for connecting to a network.

The information management server 30 may have a hardware configuration the same as that shown in FIG. 3.

Figure 4:
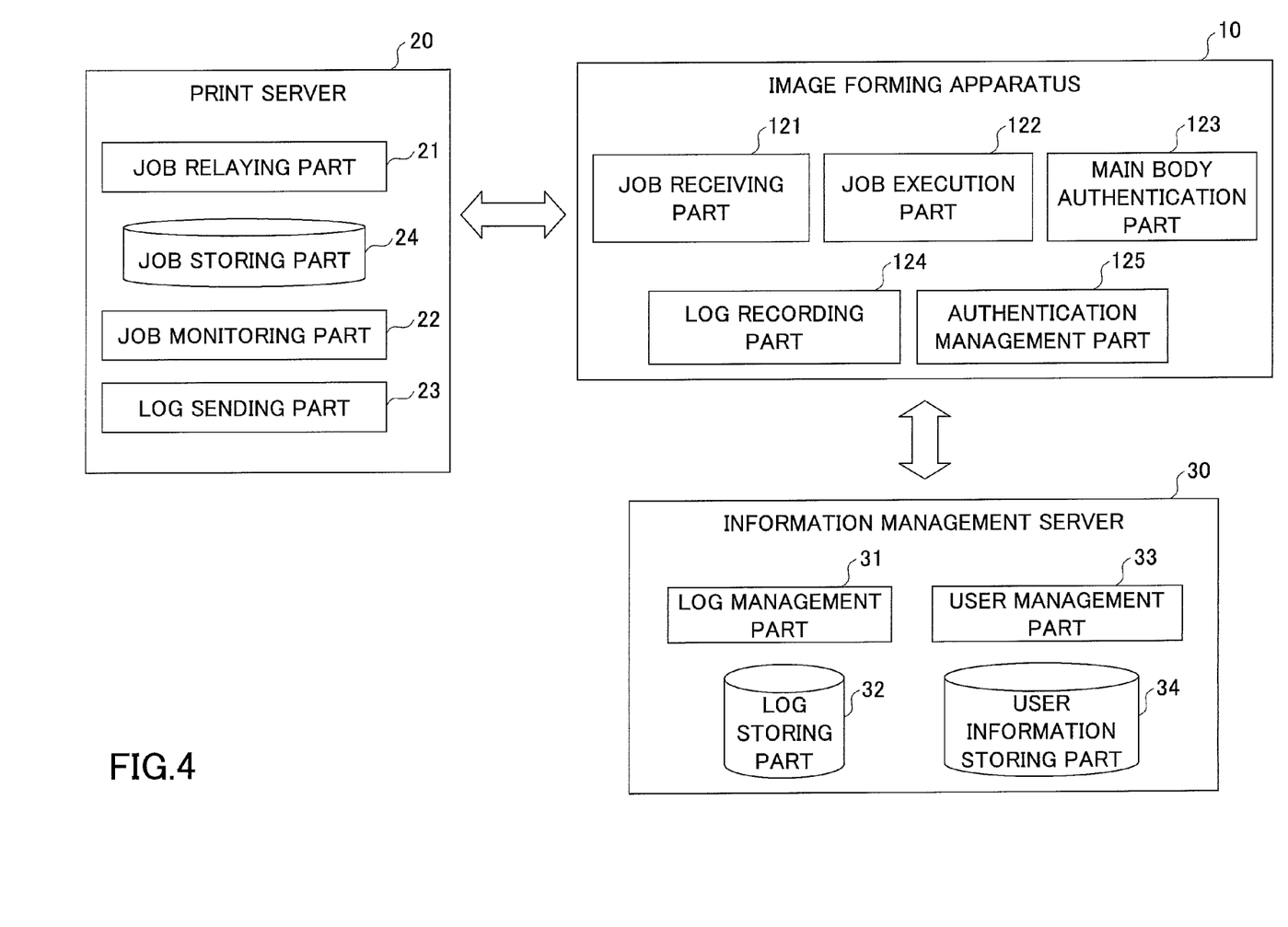
FIG. 4 is a diagram showing a functional configuration example of an information processing system in an embodiment of the present invention.

FIG. 4 is a diagram showing a functional configuration example of an information processing system in an embodiment of the present invention As shown in the figure, the image forming apparatus 10 includes a job receiving part 121, a job execution part 122, a main body authentication part 123, a log recording part 124, and an authentication management part 125 and the like. These parts are realized by processing that is executed by the CPU 111 according to a program installed in the image forming apparatus 10.

The job receiving part 121 performs reception of a print job and the like. The print job may be received via the print server 20 or may be directly received from the user terminal 50.

The job execution part 122 causes the image forming apparatus 10 to execute print processing on the print job received by the job receiving part 121.

The main body authentication part 123 determines propriety of execution of the print job according to a request from the job execution part 122. For example, the main body authentication part 123 checks whether the job is one input by a valid user.

The log recording part 124 records log information (history information) of execution of the print job in the HDD 144 and the like. In addition, the log recording part 124 transfers the recorded log to the information managing server 30 at a predetermined timing. The image forming apparatus 10b does not include the log recording part 124. Or, a log recording part 124 of the image forming apparatus 10b does not properly work. The reason is that, since the image forming apparatus 10b does not include the HDD 114, the log cannot be stored.

The authentication management part 125 requests the information management server 30 to authenticate a user for a print job.

The information management server 30 includes a log management part 31, a log storing part 32, a user management part 33, and a user information storing part 34 and the like. The log management part 31 and the user management part 33 are realized by processing executed by the CPU of the information management server 30 according to the program installed in the information management server 30. The log storing part 32 and the user information storing part 34 can be realized by using an auxiliary storing device of the information management server 30.

The log storing part 32 stores log information such as a print job executed by each image forming apparatus 10. The log management part 31 functions as an interface for the log storing part 32. The user information storing part 34 stores attribute information (user information) and the like of each user. The user management part 33 performs user authentication and the like.

The print server 20 includes a job relaying part 21, a job monitoring part 22, and a log sending part 23. These parts are realized by processing executed on the CPU 204 by the program installed in the print server 20. Also, the print server 20 includes a job storing part 24. The job storing part 24 can be realized by using the auxiliary storing device 202, for example.

The job relaying part 21 receives a print job transferred from the user terminal 50, and stores the print job in the job storing part 24. Also, the job relaying part 21 transfers the print job stored in the job storing part 24 in response to a print job obtaining request from the image forming apparatus 10. The job monitoring part 22 monitors a state of the print job transferred to the image forming apparatus 10. When the job monitoring part 22 detects completion of the print job transferred to the image forming apparatus 10, the log sending part 23 generates log information on the print job and sends the log information to the information management server 30.

Figure 5:
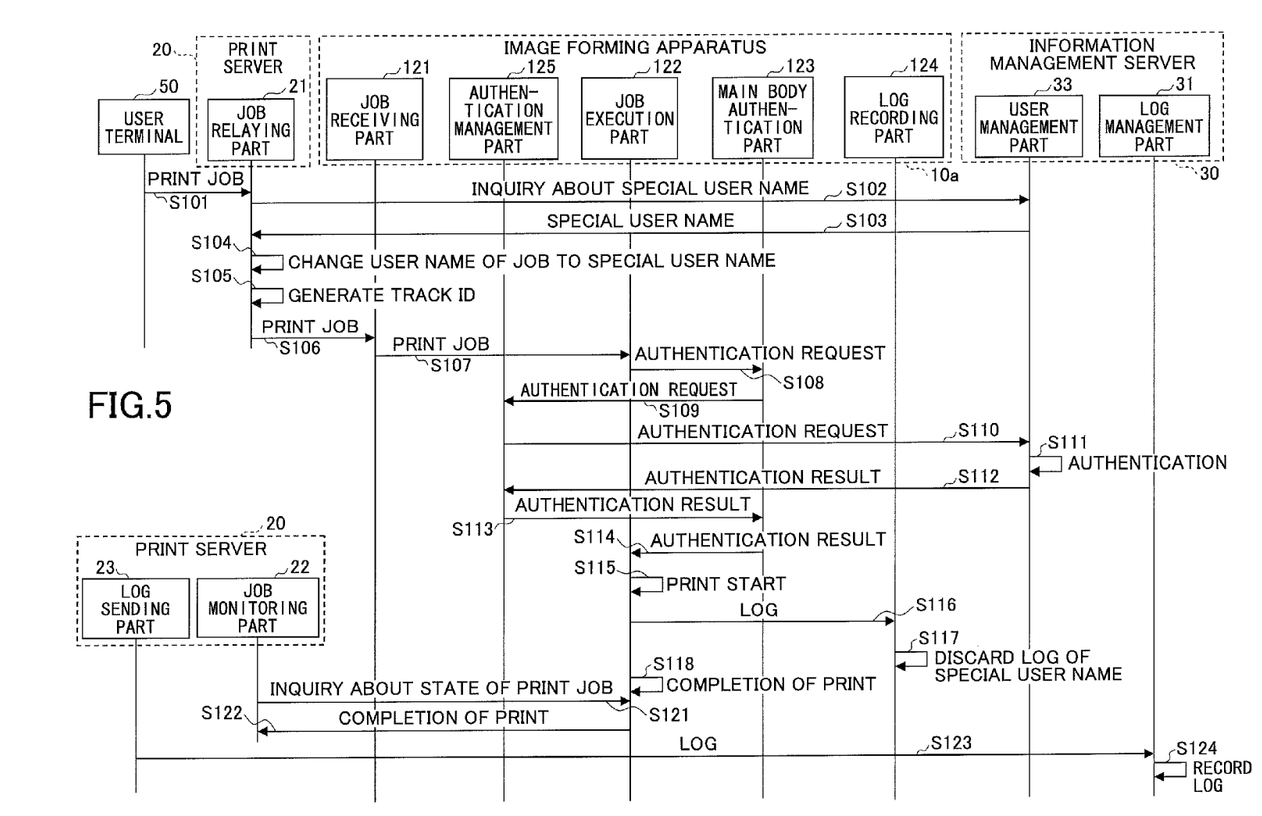
FIG. 5 is a sequence diagram for explaining a process procedure when a print job is executed in a first embodiment.

In the following, a process procedure executed by the information processing system 1 is described. FIG. 5 is a sequence diagram for explaining a process procedure when a print job is executed in a first embodiment.

In step S101, the job relaying part 21 receives a print job from the user terminal 50 via the network N. The print job includes a user name and a password of a user of a print instruction source as attribute information (the user name and the password are set in the print job). The user name and the password are input by the user via a print setting screen displayed by a printer driver, for example. The job relaying part 21 stores the received print job in the job storing part 24.

After that, the user moves to the image forming apparatus 10a, and enters the user name and the password via the operation panel 15. When the user is authenticated based on the user name and the password, the job receiving part 121 sends a request for obtaining a print job to the print server 20 by designating the user name (to be referred to as "login user name" hereinafter) of the authenticated user. Step S102 and steps after step S102 are executed according to the request for obtaining the print job.

In step S102, the job relaying part 21 sends, to the user management part 33 of the information management server 30, an inquiry about a special user name. The special user name is a user name that is recognized as a non-target of log recording by the log recording part 124 of the image forming apparatus 10a. That is, the log recording part 124 recognizes that a print job including the special user name is not a subject of log recording and log transferring and the like. The special user name may be recorded (set) in the auxiliary storage device 202 of the print server 20 beforehand. In such a case, it is not necessary that the job relaying part 21 sends the inquiry about the special user name to the user management part 33. By collectively managing special user names in the user management part 33 like the present embodiment, flexibility of handling of the special user names can be enhanced.

Next, the user management part 33 returns the special user name to the job relaying part 21 in step S103. The special user name may be dynamically generated by the user management part 33 based on an actual user name (a user name set in the print job) such that the special user name does not overlap with special user names of other users. In such a case, it is only necessary that the inquiry in step S102 includes the user name included in the print job. In a case when the conversion logic from the actual user name to the special user name is reversible, it is not necessary to hold correspondence information between the actual user name and the special user name. When the conversion logic is irreversible, the user management part 33 may hold correspondence information between the actual user name and the special user name. The special user name may be set in the information management server 30 beforehand as a fixed value.

Next, as to the print job (to be referred to as "target job" hereinafter) including the login user name, the job relaying part 21 changes the value of the user name into the special user name in step S104. Next, the job relaying part 21 generates an identifier (to be referred to as a track ID hereinafter) that is used for monitoring a state of the target job. The track ID is generated for each print job.

Next, the job relaying part 21 transfers the target job that includes the special user name as a user name to the job receiving part 212 of the image forming apparatus 10a with the target ID in step S106. For example, the track ID may be included as attribute information of the target job. When receiving the target job, the job receiving part 121 requests the job execution part 122 to execute the target job in step S107. The job execution part 122 extracts the user name and the password from the target job, and requests the main body authentication part 123 to execute authentication by designating the extracted user name and the password in step S108. The main body authentication part 123 requests the authentication management part 125 to execute authentication by designating the designated user name and the password in step S109. The authentication management part 125 requests the user management part 33 of the information management server 30 to execute authentication by designating the user name and the password in step S110.

The user management part 33 executes authentication processing by referring to user information stored in the user information storing part 34 based on the user name and the password in step S111.

Figure 6:
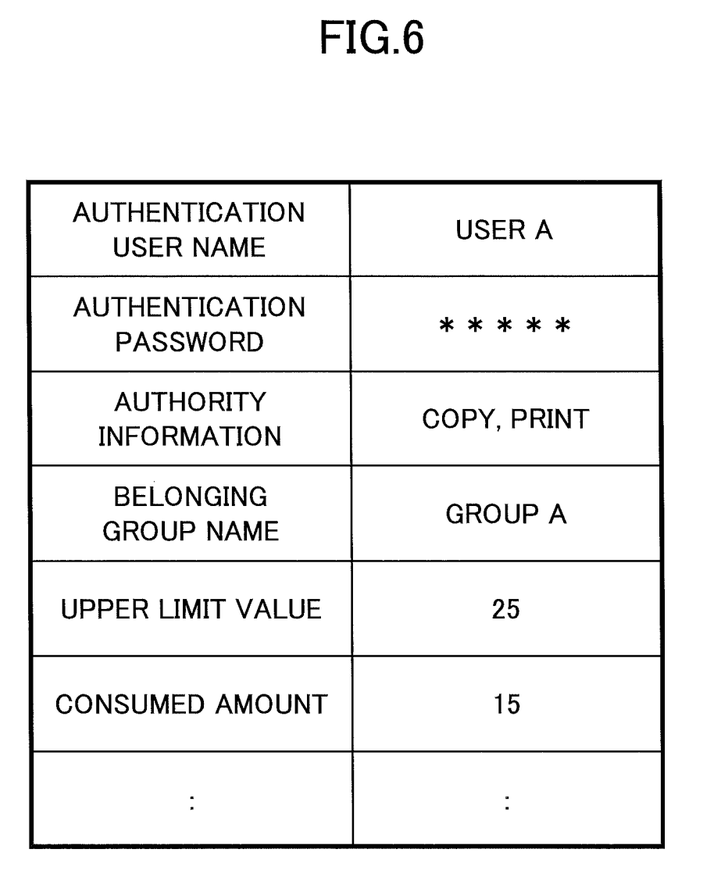
FIG. 6 is a diagram showing a configuration example of user information of one user.

FIG. 6 is a diagram showing a configuration example of user information of one user. As shown in the figure, user information includes items of authentication user name, authentication password, authority information, belonging group name, upper limit value, consumed amount, and the like.

The authentication user name and the authentication password are a user name and a password used for authentication of the user. The authority information is a type of a job or a function for which execution or use is allowed for the user. The belonging group name is a group name of a group to which the user belongs. For example, in a company, a section may be assigned a group. The upper limit value is an upper limit value of a use available number of the user. The use available number is information indicating a use available amount that is consumed according to use (execution of a job) of a function of the image forming apparatus 10. For example, each user is permitted to use the image forming apparatus 10 within a range of the upper limit value of the use available number provided to the user. The consumed amount is a consumed amount of the use available number of the user. In the following, "use available number" is a value (remaining amount) that is calculated by "upper limit value−consumed amount".

The user management part 33 determines that the authentication succeeds when the user information storing part 34 stores an authentication user name and an authentication password that are the same as the user name and the password designated in the authentication request. But, when the use available number for the user information is equal to or less than 0, the user management part 33 determines that authentication is failed. When the user name designated in the authentication request is the special user name, success or failure of authentication is determined based on whether the user information storing part 34 stores user information including an authentication user name and an authentication password the same as the actual user name specified by the special user name and the password, and based on the use available number for the user information. The actual user name specified based on the special user name is a user name obtained by reverse conversion of the special user name or a user name that is stored being associated with the special user name.

Next, the user management part 33 returns an authentication result to the authentication management part 125 in step S112. The authentication result is returned to the job execution part 122 via the authentication management part 125 and the main body authentication part 123 in steps S113 and S114.

When the authentication result indicates success of authentication, the job execution part 122 causes the image forming apparatus 10a to execute print processing based on the target job in step S115. In a process of execution of print processing, the job execution part 122 generates log information in units of pages (page-by-page), for example, and requests the log recording part 124 to record the log information in step S116.

Figure 7:
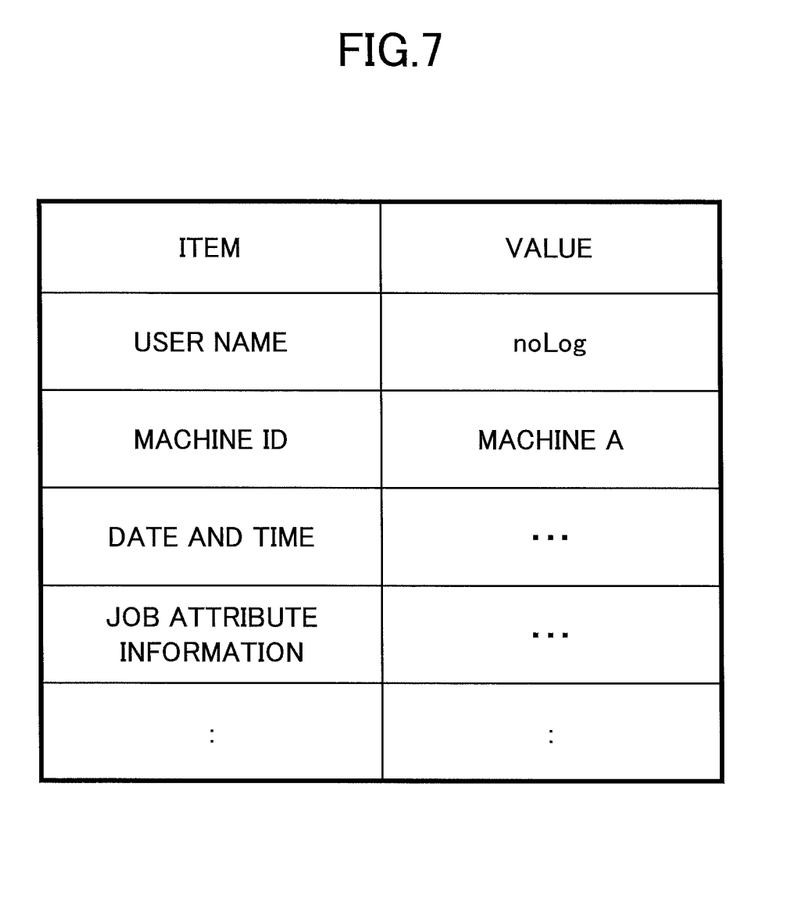
FIG. 7 is a diagram showing a configuration example of log information.

FIG. 7 is a diagram showing a configuration example of the log information. In the figure, the log information includes items of user name, machine ID, date and time, job attribute information, and the like.

The user name is one that was set in the print job. In the first embodiment, as to the print job transferred via the print server 20, the value of the user name was replaced with the special user name. In the figure, an example is shown in which "noLog" indicates the special user name. The machine ID is an ID of the image forming apparatus 10a that executed the job. The date and time is a date and time when the job was executed. The job attribute information is attribute information of the print job. For example, color/monochrome, paper size and the like are examples of the attribute information.

Next, the log recording part 124 refers to the user name included in the log information. When the user name is the special user name (noLog), the log recording part 124 discards the log information without recording it in step S117. That is, the log recording part 124 does not send the log information to the information management server 30.

On the other hand, after transferring the print job in step S106, the job monitoring part 22 of the print server 20 performs polling for inquiring about the state of the print job. The job monitoring part 22 sends an inquiry to the job execution part 122 at a constant frequency, for example. In the polling, the track ID is specified as an identifier of the print job of the target of the inquiry. When the print job corresponding to the track ID specified in the inquiry ends in step S118, the job execution part 122 returns a response indicating completion of printing in response to the inquiry in steps S121 and S122. The job monitoring part 22 detects completion of the target job based on the response. In response to the detection of completion of the target job, the log sending part 23 generates log information of the target job, and transfers the log information to the log management part 31 of the information management server 30 in step S123. The log information may have a configuration similar to one shown in FIG. 7, or may include different information. The user name of the log information includes the actual user name corresponding to the special user name. The log management part 31 records the log information in the log storage part 32 in step S124.

Based on the log information, the user management part 33 updates the consumed amount of the use available number of the user information corresponding to the user name of the log information based on the job attribute information of the log information. More specifically, a value calculated based on the job attribute information is added to the consumed amount.

As mentioned above, according to the first embodiment, as to the print job transferred from the print server 20, log information generated in the image forming apparatus 10a is discarded, so that log information generated by the print server 20 is recorded in the information management server 30 preferentially. Therefore, it can be avoided that a plurality of pieces of log information of one print job are redundantly transferred to the information management server 30.

In the above embodiment, an example has been explained in which the special user name is used as identification information for identifying necessity of transferring log information. However, identification information of another attribute item may be used for identifying necessity of transferring log information, as long as information of the attribute item is passed from the print job to the log information.

Next, a second embodiment is described. In the second embodiment, points different from the first embodiment are described. Therefore, points that are not described may be the same as those in the first embodiment.

Figure 8:
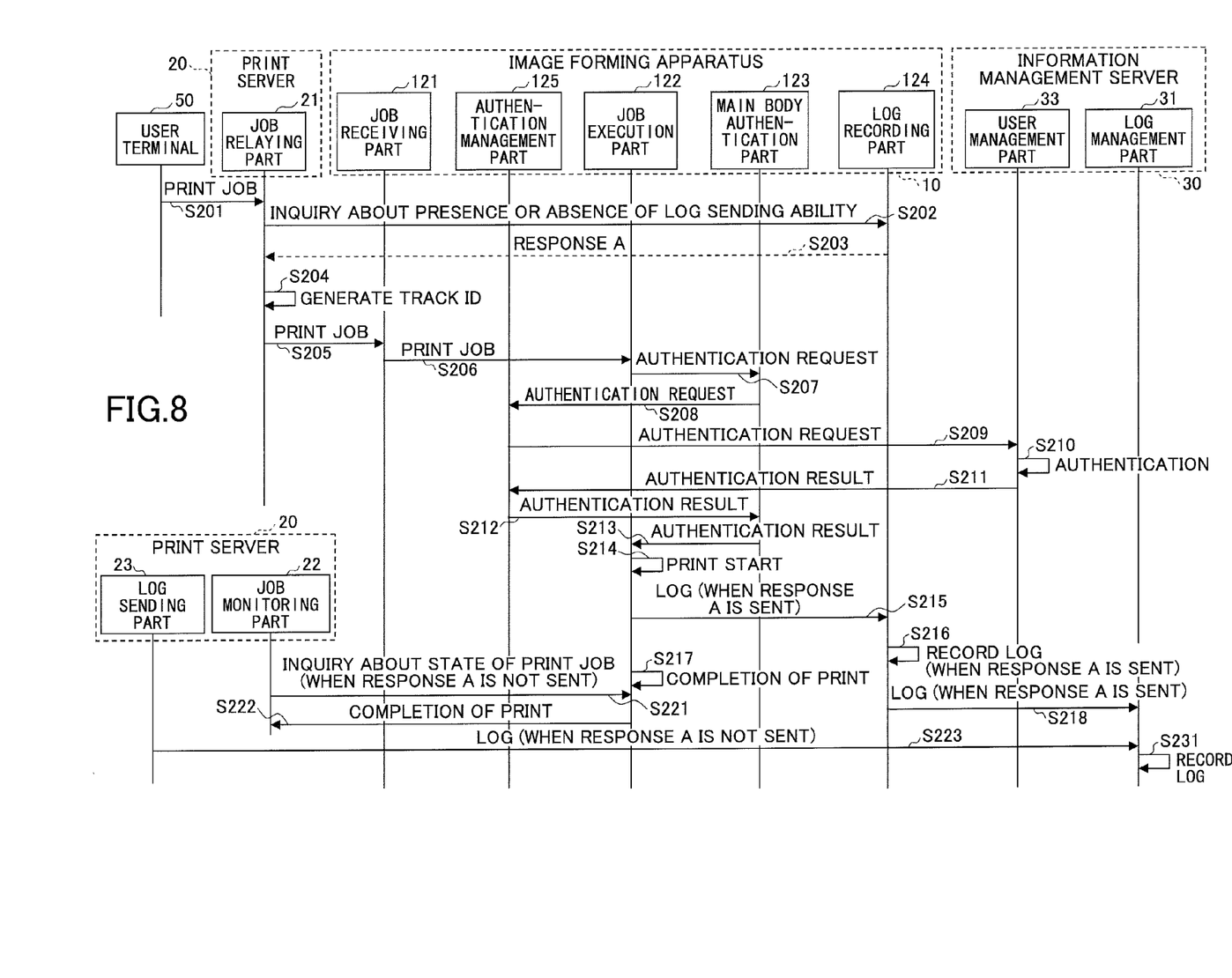
FIG. 8 is a sequence diagram for explaining a process procedure when executing a print job in a second embodiment.

FIG. 8 is a sequence diagram for explaining a process procedure when executing a print job in the second embodiment.

Step S201 is the same as step S101 of FIG. 5. Step S202 and steps after step S202 are executed according to a request for obtaining a print job from the image forming apparatus 10 in the same way as steps after step S101 of FIG. 5.

In step S202, the job relaying part 21 sends an inquiry to the image forming apparatus 10 for checking presence or absence of sending ability of log information (sending function of log information). The inquiry is sent to a port opened by the log recording part 124, for example. As mentioned above, the log recording part 124 works effectively in the image forming apparatus 10a. Therefore, the log recording part 124 of the image forming apparatus 10a receives the inquiry, and, in response to the inquiry, returns a response (to be referred to as "response A" hereinafter) indicating that the log recording part 124 has sending ability of log information in step S203. On the other hand, the log recording part 124 of the image forming apparatus 10b is not effective. Therefore, the log recording part 124 of the image forming apparatus 10b cannot receive the inquiry, and cannot return a response to the inquiry.

The job relaying part 21 stores presence or absence of the response A. Next steps S204-S214 are similar to steps S105-S115 of FIG. 5. However, in the second embodiment, replacement of the user name to the special user name is not performed. Therefore, in the second embodiment, processing for the special user name is not executed.

Next, steps S215, S216 and S218 are executed only when the response A is sent. That is, the steps are executed when the transfer destination of the target job is the image forming apparatus 10*a*. The steps are not executed when the transfer destination of the target job is the image forming apparatus 10*b*. In step S215, the job execution part 122 generates log information in units of pages (page-by-page), for example, and requests the log recording part 124 to record the log information in step S215. The log recording part 124 records the log information in the HDD 114 in step S216.

When the target job completes in step S217, the log recording part 124 transfers the log information recorded in the HDD 114 to the log management part 31 of the information management server 30 in step S218.

On the other hand, when the response A is not received, after transferring the print job in step S205, the job monitoring part 22 of the print server 20 performs polling for inquiring about the state of the print job. Therefore, in steps S221-S223, when the response A is not received (that is, when the transfer destination of the print job is the image forming apparatus 10*b*), processing similar to the steps S121-S123 of FIG. 5 is executed.

The log management part 31 records the log information received in step S218 or step S223 into the log storing part 32 in step S231.

As mentioned above, according to the second embodiment, as to the image forming apparatus 10*a* having the ability of transmission of log information, log information is not transferred from the print server 20. As to the image forming apparatus 10*b* that does not have the ability of transmission of log information, log information is transferred from the print server 20.

Therefore, as to one print job executed in the image forming apparatus 10*a*, it can be avoided that a plurality of pieces of log information are transferred redundantly to the information management server 30. In addition, log information of a print job executed by the image forming apparatus 10*b* that does not have the ability of transmission of log information can be transferred to the information management server 30.

Next, a third embodiment is described. In the third embodiment, points different from the first embodiment are described. Therefore, points that are not described may be the same as those in the first embodiment.

Figure 9:
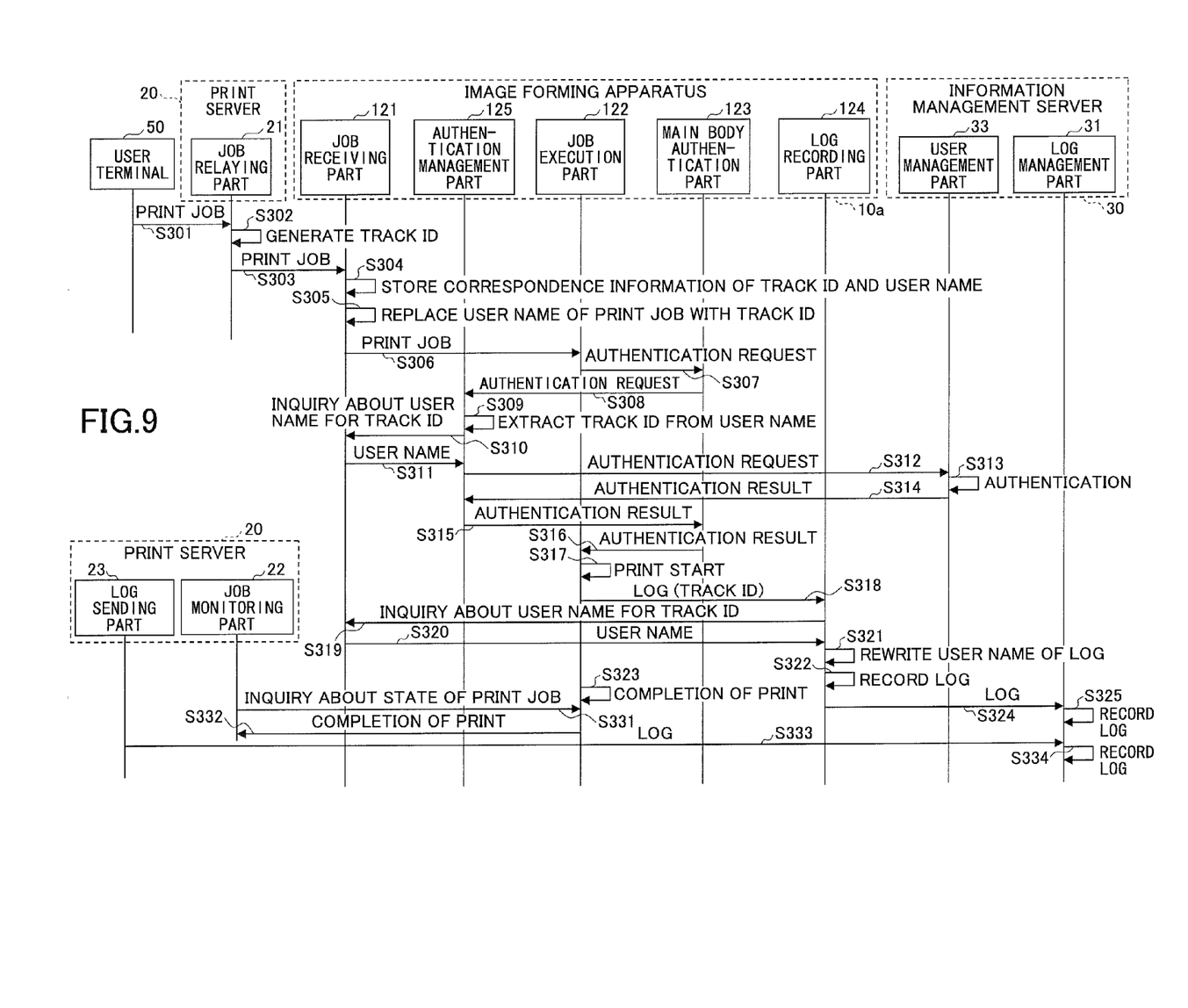
FIG. 9 is a sequence diagram for explaining a process procedure when executing a print job in a third embodiment.

FIG. 9 is a sequence diagram for explaining a process procedure when executing a print job in the third embodiment.

Step S301 is the same as step S101 of FIG. 5. Step S302 and steps after step S302 are executed according to a request for obtaining a print job from the image forming apparatus 10*a* in the same way as steps after step S101 of FIG. 5.

Steps S302 and S303 are similar to steps S105 and S106 in FIG. 5. Next, the job receiving part 121 stores correspondence information between the track ID received with the target job and the user name included in the target job in the RAM 112, for example, in step S304. Next, the job receiving part 121 rewrites the value of the user name of the target job into the track ID in step S305. For example, the value of the user name of the target job is replaced with a character string having a format such as "Flag:<track ID>". The character string of "Flag:" is identification information indicating that the value of the user name is the track ID. "<track ID>" indicates the value of the track ID.

Steps S306-S308 are similar to steps S107-S109 of FIG. 5. However, in the authentication request in steps S307 and S308, the track ID replaced from the user ID and the password are designated.

In step S309, the authentication management part 125 extracts the track ID from the user name designated in the authentication request, based on the fact that the user name starts with "Flag:". That is, the character string after "Flag:" is extracted as the track ID. Next, the authentication management part 125 sends an inquiry, to the job receiving part 121, about a user name corresponding to the track ID in step S310. In response to the inquiry, the job receiving part 121 refers to the correspondence information between the user name and the track ID stored in the RAM 112, and returns the user name corresponding to the track ID of the inquiry to the authentication management part 125 in step S311. Next, the authentication management part 125 requests the user management part 33 of the information management server 30 to execute authentication by specifying the user name and the password in step S312. Steps S313-S317 are the same as steps S111-S115 of FIG. 5.

In the process of execution of print processing, the job execution part 122 generates log information in units of pages (page-by-page), and requests the log recording part 124 to record the log information in step S318. The job execution part 122 includes the track ID into the log information.

Figure 10:
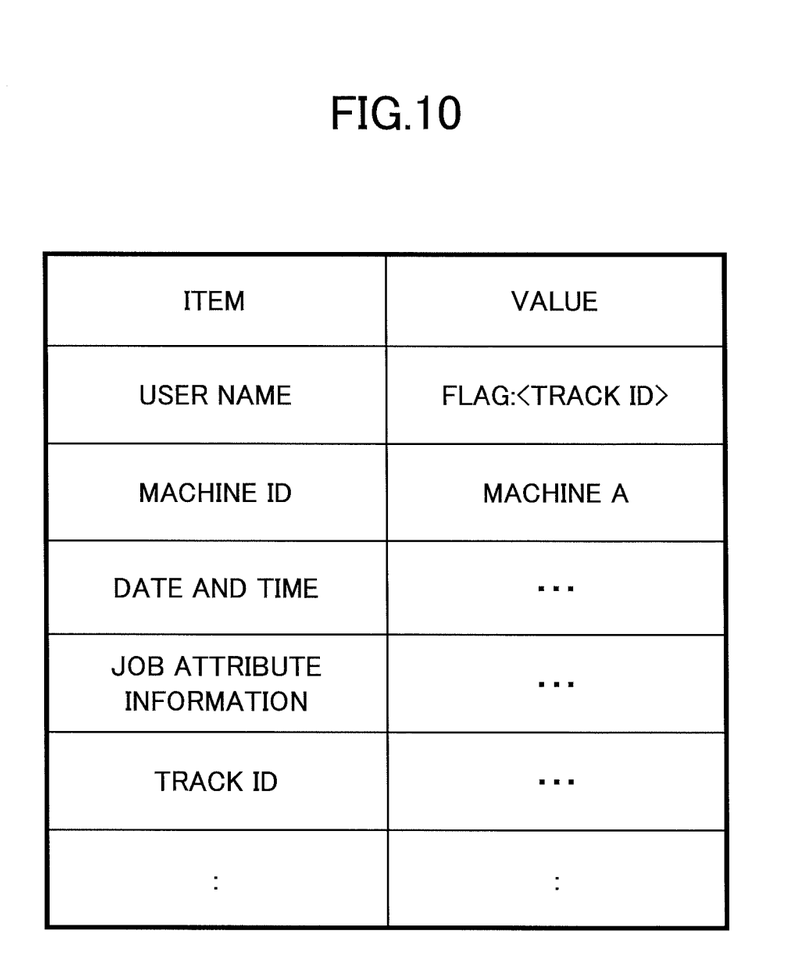
FIG. 10 is a diagram showing a configuration example of log information of the third embodiment.

FIG. 10 is a diagram showing a configuration example of log information of the third embodiment. In FIG. 10, the same parts as those of FIG. 6 are not described.

As shown in FIG. 10, the log information of the third embodiment includes the track ID. In the stage of step S318, the user name set in the target job is set in (passed to) the log information as the value of the user name. Thus, the value of the user name of the log information is "Flag:<track ID>".

Next, the log recording part 123 sends, to the job receiving part 121, an inquiry about the user name corresponding to the track ID by specifying the extracted track ID in step S319. In response to the inquiry, the job receiving part 121 refers to the correspondence information between the user name and the track ID stored in the RAM 112, and returns the user name corresponding to the track ID of the inquiry to the log recording part 124 in step S320. Next, the log recording part 124 replaces the user name included in the log information (FIG. 10) with the user name obtained in step S320. As a result, the value of the user name of the log information is restored to the actual user name. As shown in FIG. 10, the track ID is recorded in an item different from an item of the user name in the log information. Thus, even though the user name is rewritten, the track ID is not removed from the log information. Next, the log recording part 124 records the log information in the HDD 114 in step S322.

When the target job completes in step S323, the log recording part 124 transfers the log information recorded in the HDD 114 to the log management part 31 of the information management server 30 in step S324. The log management part 31 records the received log information in the log storing part 32 in step S325. At this time, the log management part 31 searches the log storing part 32 for log information including a track ID the same as the track ID included in the received log information. When the log information including the same track ID is found, the log management part 31 integrates the received log information and the searched log information, and records the integrated information in the log storing part 32. In the integration, overlapping of values in the same item may be removed to obtain one piece of log information, or two pieces of log information may be simply associated with each other, for example.

On the other hand, after transferring the print job in step S303, the job monitoring part 22 of the print server 20 performs polling for inquiring about the state of the print job. Therefore, in steps S331-S333, processing similar to steps S121-S123 of FIG. 5 is performed. But, the log sending part 23 includes the track ID generated in step S302 into the log information to be transferred in step S333. In step S334, when receiving the log information, the log management part 31 executes processing similar to step S325. Therefore, if there are a plurality of pieces of log information having a common track ID, these pieces of log information are integrated and recorded in the log storing part 32.

As mentioned above, according to the third embodiment, the track ID that can identify each print job is included in log information generated in the image forming apparatus 10a and in log information generated in the print server 20. The information management server 30 integrates pieces of log information having a common track ID to store the integrated log information. Therefore, it can be avoided that a plurality of pieces of log information of one print job are managed redundantly.

The track ID is identification information used for monitoring the print job. That is, the track ID used for integration of log information has another function for monitoring the print job. By using the identification information having a function for another function for determining identity of print job with respect to the log information, it becomes unnecessary to define new identification information.

The third embodiment is particularly effective in the case where at least one of log information generated in the image forming apparatus 10a and log information generated in the print server 20 includes information that is not included in another log information.

The processing executed by the print server 20 in each embodiment may be executed in the user terminal 50. That is, in the first embodiment, the user terminal 50 may execute processing for writing the special user name into the print job, transmission of log information to the information management server 30, and the like. Also, in the second embodiment, the user terminal 50 may execute checking of transmission ability of log information in the image forming apparatus 10, and transmission of log information when the response A is not received. Also, in the third embodiment, the user terminal 50 may execute transmission of log information including the track ID.

The user terminal 50 executes functions of the print server 20 on behalf of the print server 20, so that effects the same as those explained in the embodiments can be obtained even in a system environment where the print server 20 is not placed (that is, in a system environment where the print job is directly transferred from the user terminal 50 to the image forming apparatus 10). That is, the user terminal 50 as well as the print server 20 is an example of the information processing apparatus.

In each embodiment, the job relaying part 21 is an example of a job transmission unit and a checking unit. The log sending part 23 is an example of a first log sending unit and a log sending unit. The log monitoring part 22 is an example of a monitoring unit.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

Although embodiments are described using concrete examples, the present invention is not limited to these embodiments, but various variations and modifications may be made without departing from the broad principle and the scope of the present invention. That is, the present invention should not be limited by the detailed description of the embodiments and the drawings.

What is claimed is:

1. An information processing system comprising:
   a job execution apparatus including a job execution unit configured to execute a job, a log recording unit configured to record log information of execution of the job and a first log sending unit configured to send the recorded log information to an information management apparatus connected via a network; and
   an information processing apparatus including a job sending unit configured to send the job to the job execution apparatus, a log generating unit configured to generate log information of the job sent by the job sending unit and a second log sending unit configured to send the generated log information to the information management apparatus,
   wherein one of the job execution apparatus and the information processing apparatus comprises a recognizing unit configured to recognize not to send one of the recorded log information and the generated log information to the information management apparatus, and
   wherein the first log sending unit and the second log sending unit are configured so that the first log sending unit does not send the recorded log information to the information management apparatus while the second log sending unit sends the generated log information to the information management apparatus in response to first recognition of not sending the recorded log information by the recognizing unit, and that the second log sending unit does not send the generated log information to the information management apparatus while the first log sending unit sends the recorded log information to the information management apparatus in response to second recognition of not sending the generated log information by the recognizing unit.

2. The information processing system as claimed in claim 1, wherein the job execution apparatus comprises
   the recognizing unit configured to recognize not to send the recorded log information to the information management apparatus when predetermined identification information is included in the job, and
   the first log sending unit configured not to send the recorded log information to the information management apparatus when the predetermined identification information is included in the job.

3. The information processing system as claimed in claim 2, wherein the job sending unit sends the job including the predetermined identification information.

4. The information processing system as claimed in claim 2, wherein the first log sending unit does not send the recorded log information to the information management apparatus by discarding the log information without recording the log information when the predetermined identification information is included in the job.

5. The information processing system as claimed in claim 1, wherein the information processing apparatus comprises
the recognizing unit configured to recognize not to send the generated log information to the information management apparatus when the job execution apparatus to which the job sending unit sends the job has the first log sending unit, and
the second log sending unit configured not to send the generated log information to the information management apparatus when the job execution apparatus to which the job sending unit sends the job has the first log sending unit.

6. The information processing system as claimed in claim 5, further comprising:
an inquiry sending unit configured to send an inquiry to the job execution apparatus for checking whether the job execution apparatus to which the job sending unit sends the job has the first log sending unit or not, wherein
the recognizing unit recognizes not to send the generated log information to the information management apparatus when the job execution apparatus to which the job sending unit sends the job has the first log sending unit based on a response to the inquiry.

* * * * *